US010485717B2

(12) United States Patent
Moss

(10) Patent No.: US 10,485,717 B2
(45) Date of Patent: Nov. 26, 2019

(54) SEAT BASE ASSEMBLY AND LATCHING ASSEMBLY FOR A REAR-ENTRY VEHICLE

(71) Applicant: The Braun Corporation, Winamac, IN (US)

(72) Inventor: Matthew D. Moss, Monticello, IN (US)

(73) Assignee: The Braun Corporation, Winamac, IN (US)

( * ) Notice: Subject to any disclaimer, the term of this patent is extended or adjusted under 35 U.S.C. 154(b) by 95 days.

(21) Appl. No.: 15/812,071

(22) Filed: Nov. 14, 2017

(65) Prior Publication Data
US 2018/0140484 A1    May 24, 2018

Related U.S. Application Data

(60) Provisional application No. 62/423,900, filed on Nov. 18, 2016.

(51) Int. Cl.
| | | |
|---|---|---|
| B60N 2/10 | (2006.01) | |
| A61G 3/08 | (2006.01) | |
| B60N 2/20 | (2006.01) | |
| B60N 2/04 | (2006.01) | |
| B60Q 9/00 | (2006.01) | |
| B60N 2/876 | (2018.01) | |
| B60N 2/14 | (2006.01) | |
| B60N 2/30 | (2006.01) | |
| B60N 2/859 | (2018.01) | |
| E05B 77/54 | (2014.01) | |
| B60N 2/75 | (2018.01) | |

(52) U.S. Cl.
CPC ............. *A61G 3/0808* (2013.01); *B60N 2/04* (2013.01); *B60N 2/10* (2013.01); *B60N 2/146* (2013.01); *B60N 2/20* (2013.01); *B60N 2/3011* (2013.01); *B60N 2/3043* (2013.01); *B60N 2/859* (2018.02); *B60N 2/876* (2018.02); *B60Q 9/00* (2013.01); *B60N 2/753* (2018.02); *E05B 77/54* (2013.01)

(58) Field of Classification Search
CPC . B60N 2/10; B60N 2/14; B60N 2/146; B60N 2/245; B60N 2/30; B60N 2/304; B60N 2/3043; B60N 2/035; B60N 2/305
USPC ........ 296/65.05, 65.11, 65.09; 297/314, 325, 297/326, 331, 335
See application file for complete search history.

(56) References Cited

U.S. PATENT DOCUMENTS 3,727,976 A * 4/1973 Lystad .................. B60N 2/0292
  296/66
5,707,103 A * 1/1998 Balk .................. B60N 2/01583
  297/13

(Continued)

*Primary Examiner* — Dennis H Pedder
(74) *Attorney, Agent, or Firm* — Taft Stettinius & Hollister LLP; Stephen F. Rost

(57) ABSTRACT

A latch assembly of a seat is provided in a vehicle. The latch assembly includes a base including a first pin and a second pin. A first latch includes a first housing and a first latch mechanism at least partially enclosed within the first housing. The first latch is pivotally coupled to the base. A second latch includes a second housing and a second latch mechanism at least partially enclosed within the second housing. The second latch is pivotally coupled to the base. The first latch is disposed in its latched position when the first latch engages the first pin, and the second latch is disposed in its latched position when the second latch engages the second pin. The first latch and the second latch are not disposed in their respective latched positions at the same time.

20 Claims, 17 Drawing Sheets

(56) References Cited

U.S. PATENT DOCUMENTS

| | | | | |
|---|---|---|---|---|
| 5,984,397 A * | 11/1999 | Dawson | ............... | B60N 2/2222 |
| | | | | 296/65.09 |
| 6,793,285 B1 * | 9/2004 | Tame | ................... | B60N 2/3011 |
| | | | | 297/336 |
| 6,843,526 B2 * | 1/2005 | Honda | ................. | B60N 2/3011 |
| | | | | 296/65.03 |
| 7,494,173 B2 * | 2/2009 | Hatta | ................ | B60N 2/01583 |
| | | | | 296/65.12 |
| 7,753,428 B2 * | 7/2010 | Kato | ................... | B60N 2/3043 |
| | | | | 296/65.08 |
| 7,954,873 B2 * | 6/2011 | Abe | .................... | B60N 2/3011 |
| | | | | 296/65.05 |
| 8,091,945 B2 * | 1/2012 | Hancock | ............. | B60N 2/3011 |
| | | | | 296/65.06 |
| 8,562,060 B2 * | 10/2013 | Kato | ................. | B60N 2/01583 |
| | | | | 296/65.12 |
| 2013/0313395 A1 * | 11/2013 | Blake | ................ | B60N 2/01583 |
| | | | | 248/503.1 |
| 2016/0171859 A1 * | 6/2016 | Bowlus | .................. | G08B 21/02 |
| | | | | 340/457 |
| 2017/0001546 A1 * | 1/2017 | Keyser | ................ | B60N 2/3065 |

* cited by examiner

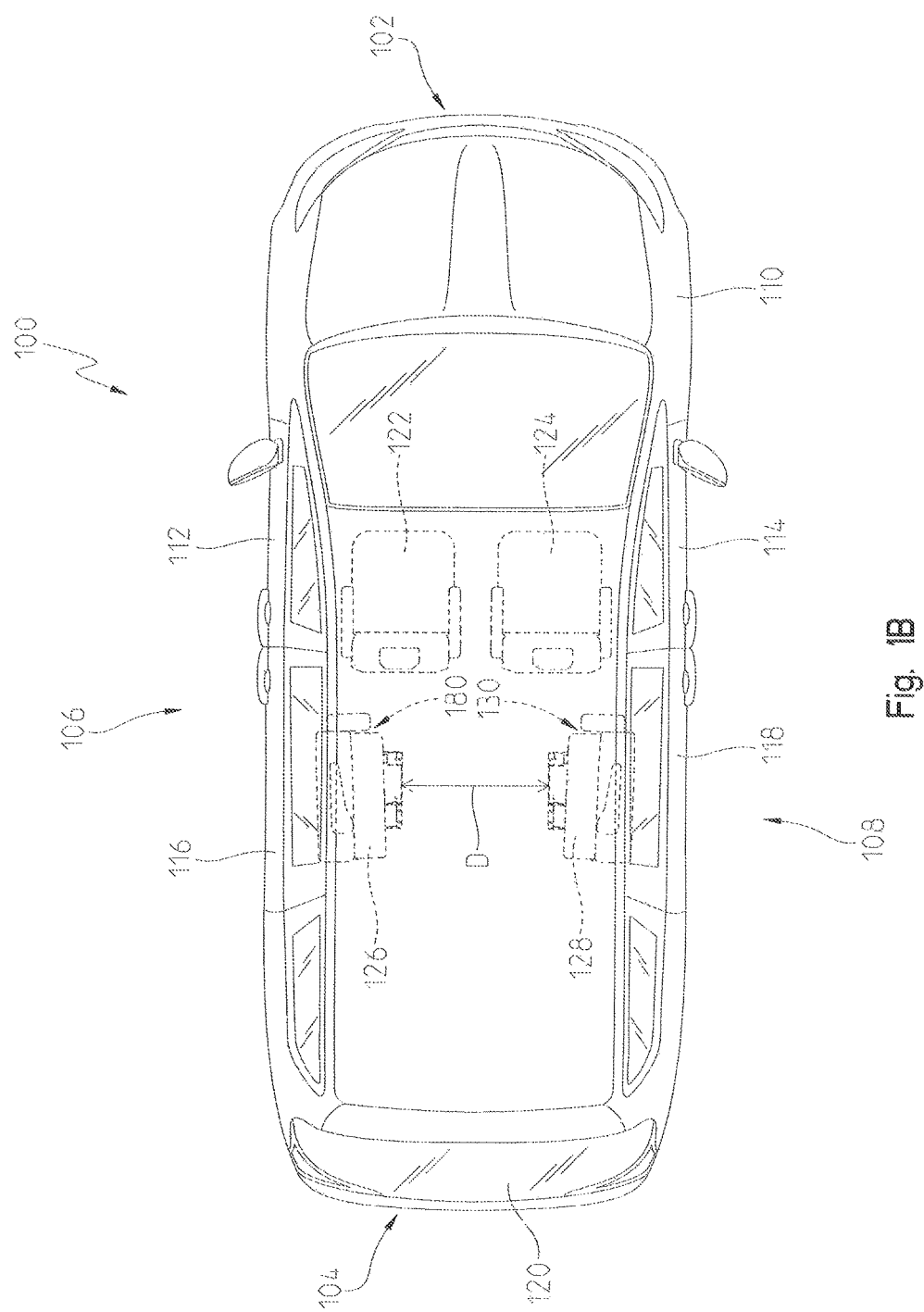
Fig. B

SEAT BASE ASSEMBLY AND LATCHING ASSEMBLY FOR A REAR-ENTRY VEHICLE

RELATED DISCLOSURES

The present application claims the benefit of U.S. Provisional Patent Application Ser. No. 62/423,900, filed Nov. 18, 2016, the disclosure of which is hereby incorporated by reference in its entirety.

FIELD OF THE DISCLOSURE

The present application relates to a passenger vehicle for transporting one or more passengers, and more particularly to a modified passenger vehicle which is configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van is retrofitted with a ramp to enable a physically limited individual using a wheelchair to enter and exit the vehicle without the assistance of another individual.

Other known products for retrofitting a vehicle, such as a van, include wheel chair lifts, lift platforms, and lowered floor surfaces. In some instances, a floor of an original equipment manufacturer (OEM) vehicle is lowered or otherwise modified to accommodate an entry and exit of the physically limited individual through a side door or entrance of the vehicle. Once inside the vehicle, individual who uses the assisted entrance is located in a rear passenger compartment of the vehicle adjacent to or behind the side entrance.

In one known retrofitted vehicle, a floor of the OEM vehicle is lowered to accommodate the physically limited passenger, e.g., one seated in a wheelchair. In some vehicles, which are considered as viable candidates for retrofitting, the construction of the OEM vehicle requires significant modification to accommodate the lowered floor. Not only must a subfloor be added, but additional floor space inside the vehicle, and in particular, the rear passenger compartment. Even with a lowered floor, however, passenger seats located in the vehicle can still present an obstacle for a wheelchair to fit comfortably within the vehicle.

SUMMARY

In one embodiment of the present disclosure, a latch assembly of a seat in a vehicle includes a base including a first pin and a second pin; a first latch including a first housing and a first latch mechanism at least partially enclosed within the first housing, the first latch being pivotally coupled to the base; and a second latch including a second housing and a second latch mechanism at least partially enclosed within the second housing, the second latch being pivotally coupled to the base; wherein, the first latch is disposed in its latched position when the first latch engages the first pin, and the second latch is disposed in its latched position when the second latch engages the second pin; wherein, the first latch and the second latch are not disposed in their respective latched positions at the same time.

In one example of this embodiment, the latch assembly includes a front plate disposed at a front end; a rear plate disposed at a rear end; a first side plate and a second side plate, the first side plate being spaced from the second side plate, and both the first and second inner side plates being disposed substantially parallel to and between the front plate and the rear plate; wherein, the first latch is pivotally coupled to the front plate and first side plate, and the second latch is pivotally coupled to the rear plate and the second side plate. In a second example, the latch assembly may include anti-rattle bumpers disposed in contact with the first and second latches in one of their latched or unlatched positions. In a third example, the first latch mechanism is offset from the first pin in the unlatched position.

In a fourth example, the first latch is movable about a pivot pin between its latched position and an unlatched position. In a fifth example, the first latch is movable approximately 90° between its latched and unlatched positions. In a sixth example, the first latch includes a cylindrically-shaped front bar configured to couple to the seat; and a plate coupled to the first housing. In a seventh example, the second latch mechanism includes a first plate, a second plate, and a third plate. In another example, the first plate, the second plate, and the third plate comprise substantially C-shaped bodies with a defined opening for receiving the second pin. In a further example, the second latch includes a latch body and a bumper plate, the bumper plate formed of a compressive material configured to compress against the seat in the latched position.

In another embodiment of the present disclosure, a seat assembly of a vehicle includes a seat portion; a back portion pivotally coupled to the seat portion; a rail system comprising a first arm and a second arm, the first arm being spaced from the second arm; a latch assembly comprising a base, a first latch, and a second latch, wherein the base including a first pin and a second pin; the first latch includes a first housing and a first latch mechanism at least partially enclosed within the first housing, the first latch being pivotally coupled to the base; and the second latch includes a second housing and a second latch mechanism at least partially enclosed within the second housing, the second latch being pivotally coupled to the base; wherein, the seat portion is configurable in at least a first position and a second position, where in the first position the back portion is disposed upright relative to the seat portion, and in the second position the seat portion is disposed in a folded position; wherein, in the first position the first latch is disposed in its latched position with the first latch engaging the first pin, and in the second position the second latch is disposed in its latched position with the second latch engaging the second pin.

In this embodiment, the first latch and the second latch are not disposed in their respective latched positions at the same time. In another example of this embodiment, the first latch is coupled to the first arm and the second arm in the first and second positions. In yet another example, anti-rattle bumpers may be disposed in contact with the first and second latches in one of their latched or unlatched positions. In a further example, the first latch is movable about a pivot pin between its latched position and an unlatched position. In yet a further example, the second latch mechanism includes a first plate, a second plate, and a third plate. In still yet a further example, the second latch includes a latch body and a bumper plate, the bumper plate formed of a compressive material configured to compress against the seat in the latched position.

In a further embodiment of the present disclosure, a vehicle for accommodating a wheel-chaired passenger includes a body; a controller for controlling the vehicle; a plurality of seats coupled to the body, where each of the plurality of seats includes a latch assembly; the latch assembly including a base having a first pin and a second pin, a first latch pivotally coupled to the base and including a first housing and a first latch mechanism at least partially enclosed within the first housing, and a second latch pivotally coupled to the base and including a second housing and a second latch mechanism at least partially enclosed within the second housing; a first latch sensor for detecting a position of the first latch, the first latch being in communication with the controller; and a second latch sensor for detecting a position of the second latch, the second latch being in communication with the controller; wherein, at least one of the plurality of seats is configurable in at least one of an unfolded position and a folded position; wherein, in the unfolded position the first latch is disposed in its latched position with the first latch engaging the first pin, and in the folded position the second latch is disposed in its latched position with the second latch engaging the second pin; further wherein, the controller is configured to receive a signal from the first latch sensor and second latch sensor indicative of the detected position of the first latch and second latch, respectively.

In a first example of this embodiment, the controller outputs a response based on the detected positions of the first latch and the second latch. In a second example, the response may include disabling an ignition, displaying a visual warning on a display, triggering an audible alarm, or disabling an auto door control feature on the vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 1B is a top view of the vehicle of FIG. 1A with at least two of the seats in a folded position;

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1A:
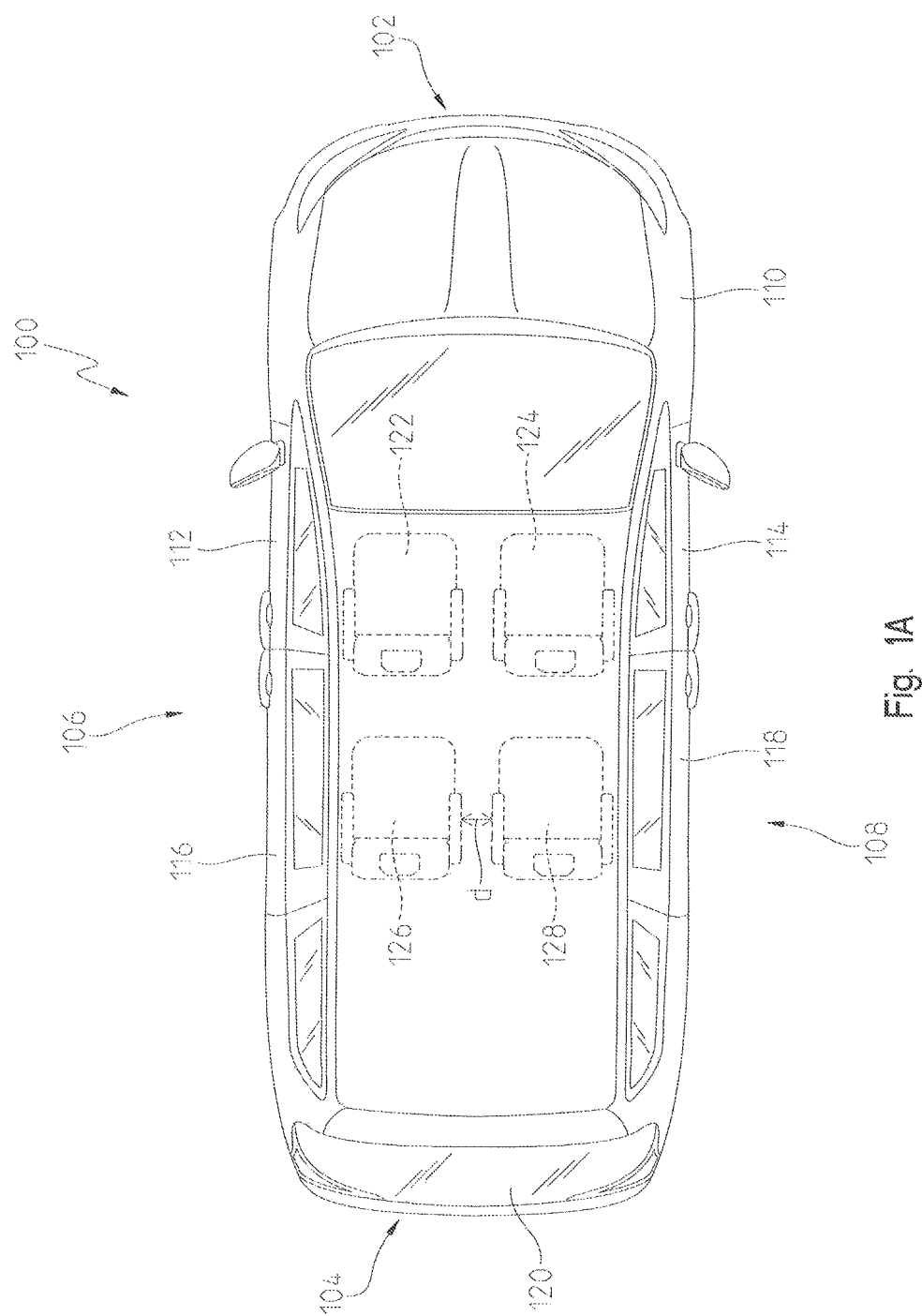
FIG. 1A is a top view of a conventional passenger vehicle including a plurality of seats in their upright, unfolded position.

FIGS. 1A and 1B illustrate a vehicle 100, commonly identified as a passenger van, available from any number of United States and foreign manufacturers. In the illustrated embodiment, the vehicle 100 includes a unibody construction, but other vehicles having a frame on body construction, are also included in the present disclosure. Consequently the use of vehicle herein includes all types and kinds of vehicles with a body on frame construction, a unibody construction, or other constructions. In addition, while the passenger van 100 is illustrated in FIG. 1, the present disclosure is directed to all passenger vehicles carrying one or more passengers.

The vehicle 100 includes a body 110 that has a front side 102, a rear side 104, a first side 106 (i.e., driver's side), and a second side 108 (i.e., opposite the driver's side). The body 110 may be operatively coupled to front wheels and rear wheels (not shown). The vehicle 100 includes a unibody construction. The vehicle 100 may include a first front door 112, a second front door 114, a first rear door 116, and a second rear door 118. The first front door 112 and first rear door 116 are disposed on the first side 106 of the vehicle 100, whereas the second front door 114 and second rear door 118 are disposed on the second side 108 thereof. The vehicle 100 may further be equipped with a rear door or hatch 120 that permits rear entry to the vehicle.

Located within the vehicle 100 is a plurality of seats. In FIGS. 1A and 1B, a driver or operator of the vehicle 100 may be seated in a driver's seat 122. A passenger seated upfront may be seated in a front passenger seat 124. In this embodiment, the vehicle 100 may include a first rear seat 126 and a second rear seat 128. In other embodiments, a bench seat may be provided. Moreover, additional seats may be located behind the first and second rear seats depending upon the length of the vehicle 100.

The aforementioned first and second rear doors may be modified to slide along one or more tracks to increase the size of an opening 112 to the interior of the vehicle. Alternatively, the doors may be hinged to the frame or body 110 of the vehicle 100. The vehicle may further include a ramp assembly (not shown) which provides rolling access of a wheelchair from a ground surface into an interior of the vehicle 100. The ramp assembly may be coupled to either side or the rear of the vehicle. The ramp assembly may be movable between the interior of the vehicle, where it is stored in some embodiments, and to the exterior for wheelchair access.

In known modified vehicles, such as the modified van, the middle row of seats is removed from the manufacturer supplied vehicle to enable access to a wheelchair supporting a passenger. Once the wheelchaired passenger moves into the interior of the vehicle, the passenger or caregiver locates the wheelchair in the middle portion of the interior behind the driver and passenger seats of the front row. As used herein, a wheelchaired passenger is used to indicate that the individual is making use of a wheelchair, whether that use is temporary or permanent.

In one such modification, the floor of the OEM vehicle may be lowered in order to better accommodate a wheelchaired passenger and provided additional floor space for such accommodation. In doing so, a conventional suspension assembly may be retrofitted to allow for the lowered vehicle floor.

In another embodiment, the rear or middle row of seats may be folded and pivoted outwardly toward the side doors to make room in the middle of the vehicle for a wheelchair. In FIG. 1A, for example, the first rear seat 126 and second rear seat 128 are shown in their upright, unfolded position. In this position, a person may be seated in the chair as is commonly known in the art. In FIG. 1B, however, the first rear seat 126 and second rear seat 128 are repositioned to a folded position 130 towards the first rear door 116 and second rear door 118. As shown, the amount of space inbetween the folded seats is much greater than when the seats are in their upright, unfolded position. In FIG. 1A, for example, a distance between the first and second rear seats is identified as d, whereas in FIG. 1B the distance is identified as D, where D is greater than d. In one non-limiting example, D may be at least twice d.

Figure 2:
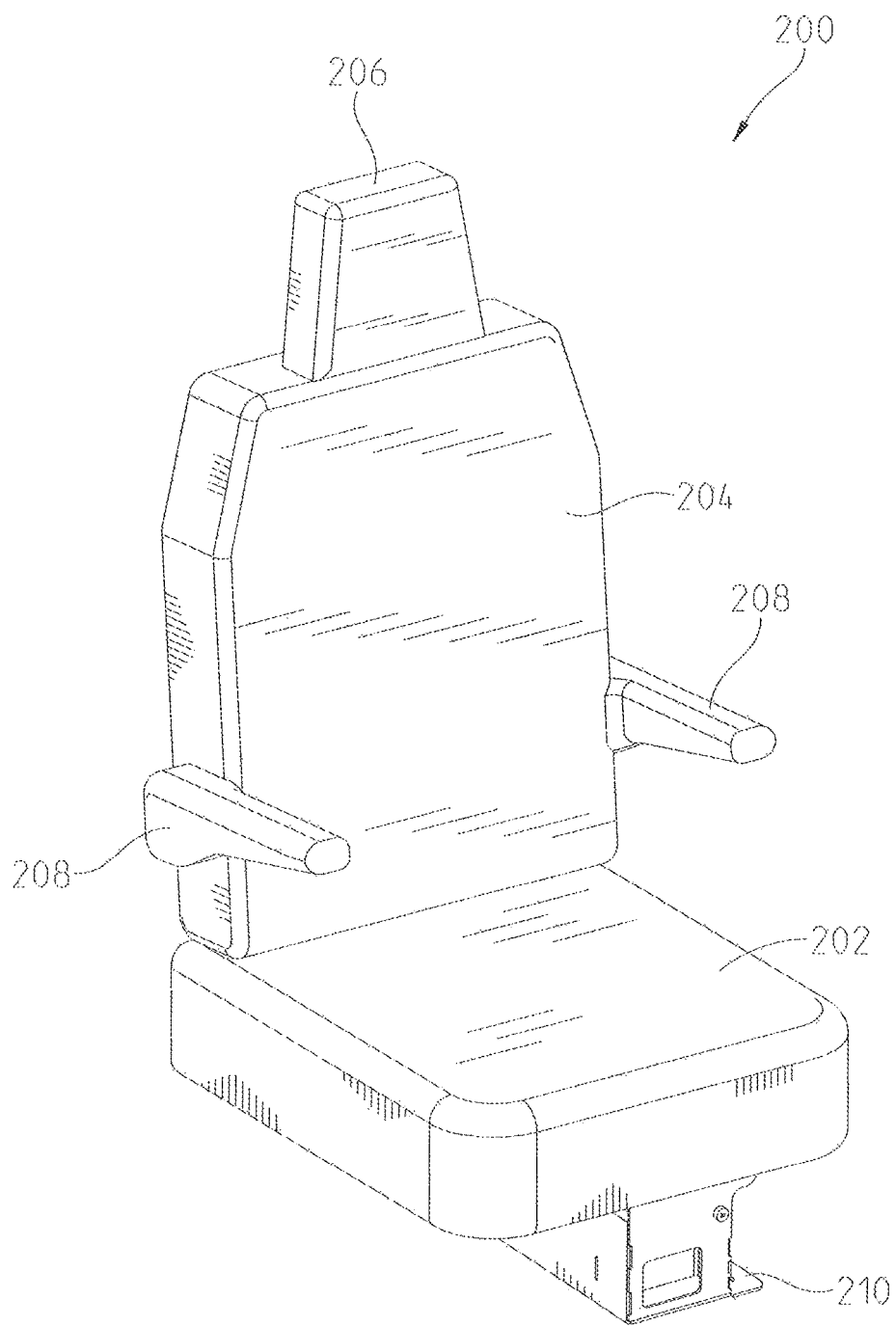
FIG. 2 is a perspective view of a seat assembly in its unfolded position.

Turning now to FIG. 2, an embodiment of a seat 200 is shown. The seat 200 may be similar to any of the seats depicted in FIGS. 1A and 1B. As shown, the seat 200 may include a seat portion 202, a back portion 204 coupled to the seat portion 202, and a head rest 206. The head rest 206 may be pivotally coupled to the back portion 204. Moreover, an arm rest 208 may be pivotally coupled to each side of the back portion 204. The seat portion may be mounted to a base 210, which in turn may be coupled to a floor of the vehicle 100. In FIG. 2, the seat 200 is disposed in its upright, unfolded position.

Figure 3A:
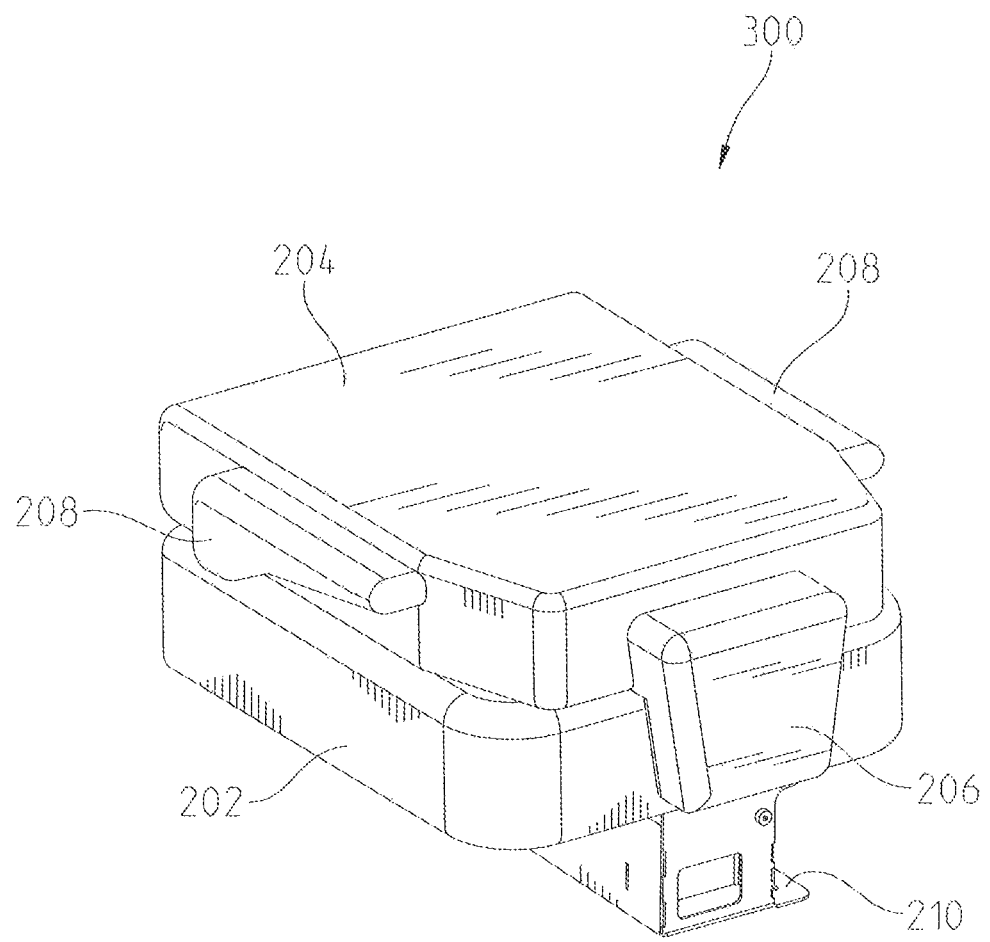
FIG. 3A is a perspective view of the seat assembly of FIG. 2 in a partially folded position.
Figure 3B:
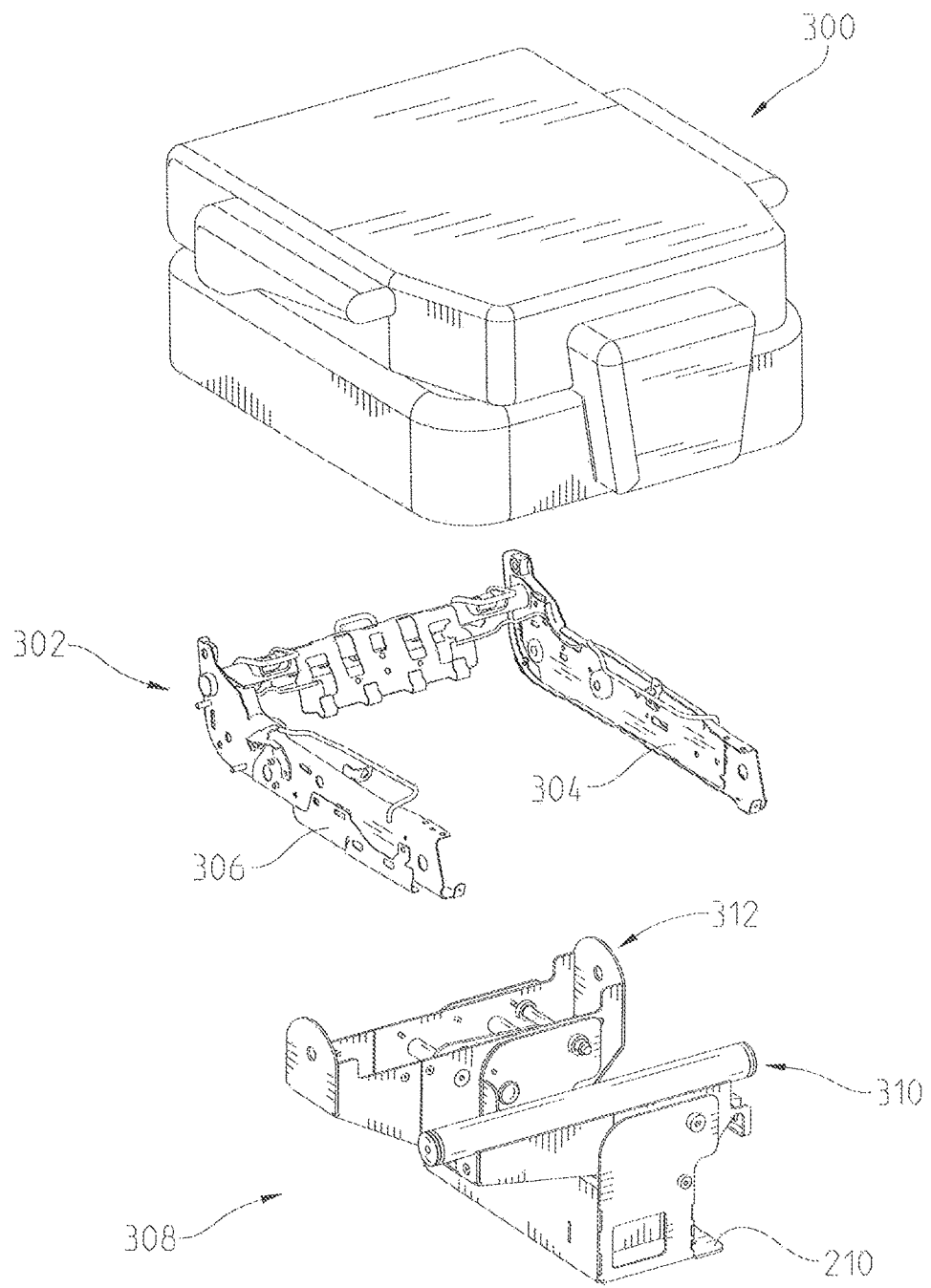
FIG. 3B is an exploded view of the seat assembly of FIG. 3A.

Referring to FIGS. 3A and 3B, the seat 200 is depicted in a partially folded position 300. In particular, the back portion 204 may be folded down and rest on the seat portion 202. In some embodiments, the back portion 204 may be folded into close proximity without contacting the seat portion 202. Although not shown, a lever, switch or other control may be actuated to pivot the back portion 204 to this partially folded position 300.

In FIG. 3B, the seat 200 is shown separated from the base 210. Here, a rail system 302 may be coupled to the bottom of the seat 200 and further coupled to the base 210 for mounting the seat 200 to the base 210. The rail system 302 may include a first arm 304 and a second arm 306. The first arm 304 and second arm 306 may be spaced from one another such that the first arm 304 is coupled to one side of the seat 200 and the second arm 306 is coupled to the opposite side thereof. Each arm may include a plurality of openings for coupling the rail system 302 to the base 210.

The base 210 may include openings for fastening to the floor of the vehicle. Moreover, the base 210 may include a latching assembly 308 for securing the seat in its upright, unfolded position of FIG. 2, its partially folded position 300 of FIG. 3A, and its folded position of FIG. 4. As will be described in further detail below, the latching assembly 308 may include a first latch 310 and a second latch 312.

Figure 4:
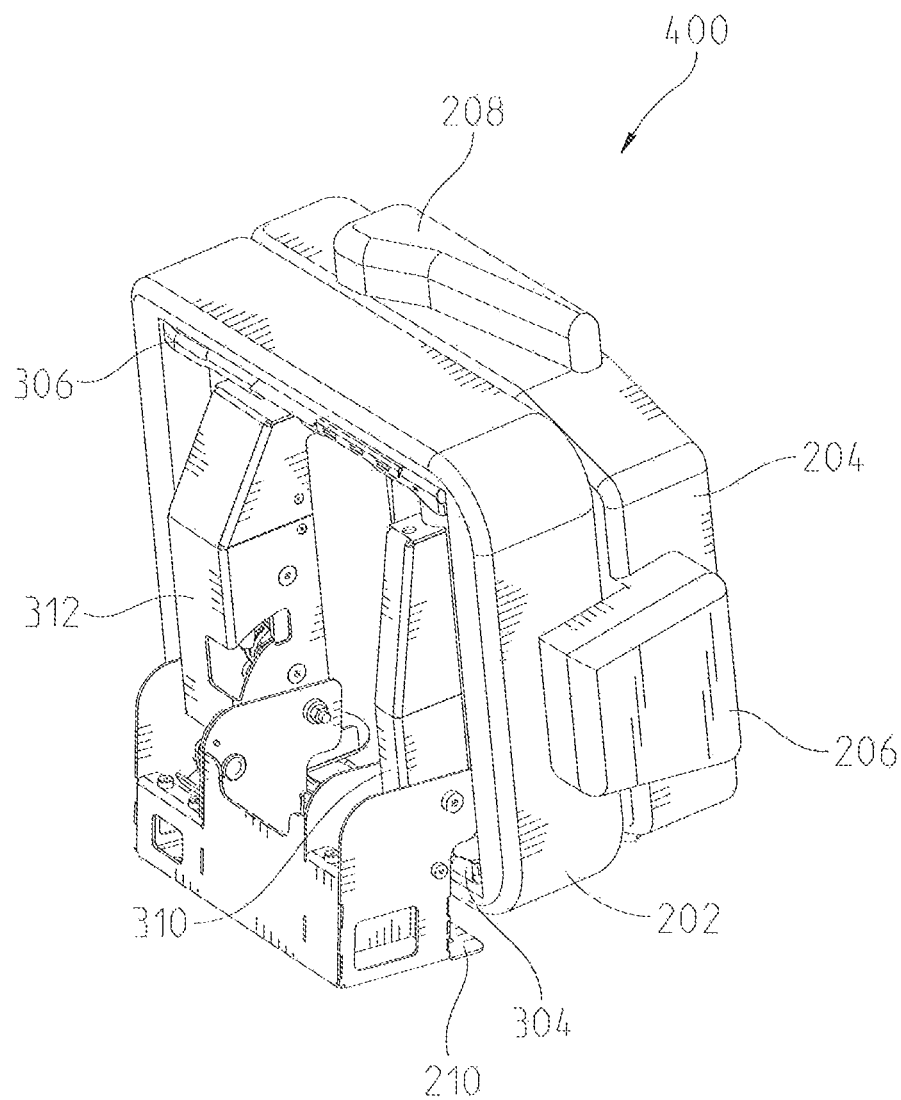
FIG. 4 is a perspective view of the seat assembly of FIG. 2 in a folded position.
Figure 5:
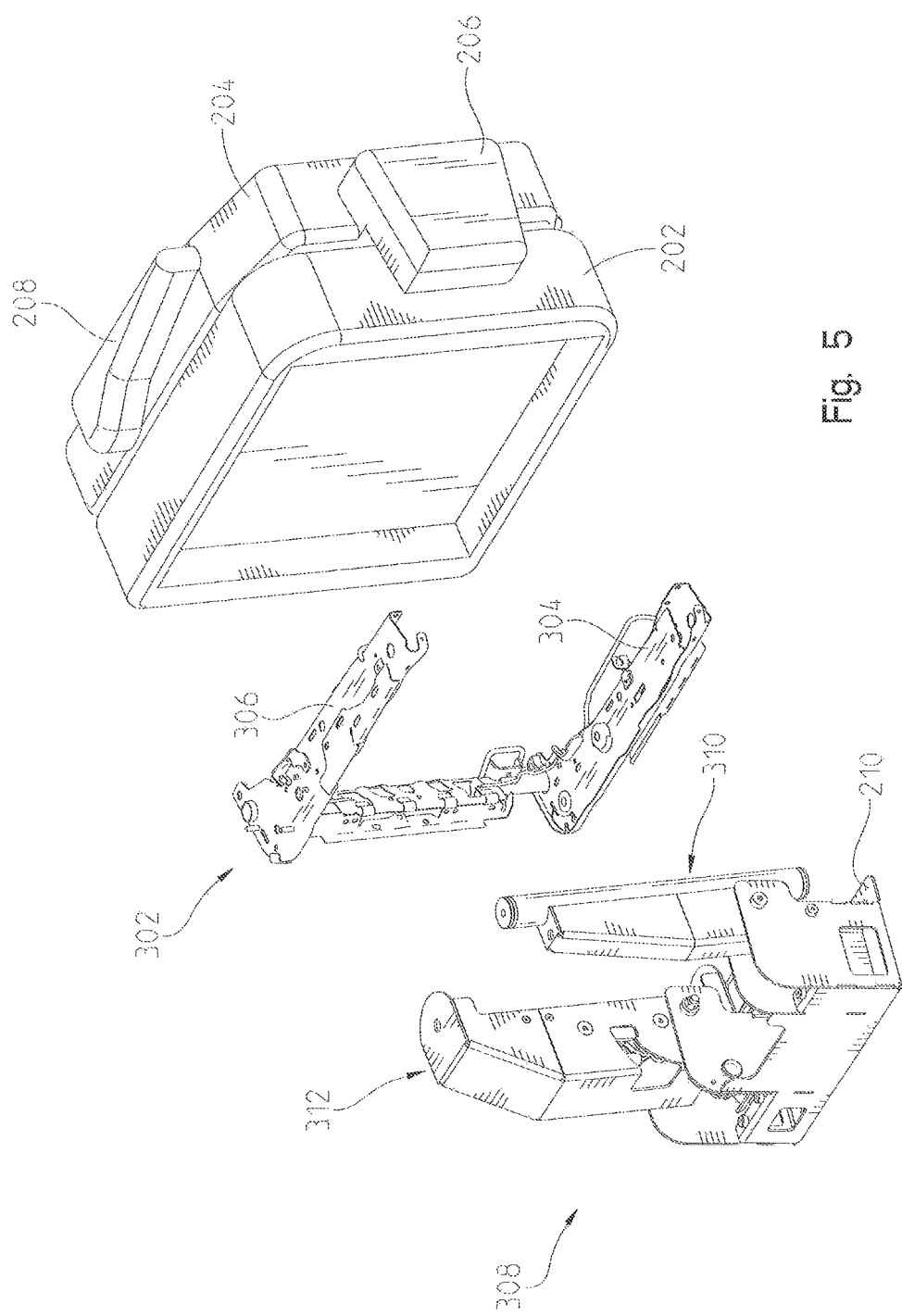
FIG. 5 is an exploded view of the seat assembly of FIG. 4.

As shown in FIGS. 4 and 5, the seat 200 is capable of being folded to a position in which it is approximately 90° pivoted with respect to the positioned in FIGS. 2 and 3. As shown, the latch assembly 308 pivots toward the closest rear door so that a middle portion between rear seats becomes unoccupied. In other words, the seat 200 is pivotable in a sideways direction from its partially folded position 300 of FIG. 3A.

Referring to FIGS. 6-9, the latching assembly 308 will now be described in greater detail. As described above, the latching assembly 308 may include a first latch 310 and a second latch 312. The first latch 310 may be disposed towards a front 600 of the latching assembly 308, and the second latch 312 may be disposed towards a rear 602 thereof. Each latch is coupled to the base 210. The base 210 may include a base plate 700 (FIG. 7), front plate 604, a rear plate 606, and a side plate 608.

The first latch 310 may be formed as a rotary latch with an elongated front bar 610 coupled to a housing 612. The front bar 610 may include openings defined at each end for being fastened to the first arm 304 and the second arm 306. The housing 612 may include a plurality of openings through which fasteners 900 (FIG. 9) may couple the housing 612 to the front plate 604 and side plate 608. As shown in FIG. 7, the housing 612 may also be coupled to an inner side plate 628 that is located on a side opposite the front plate 604. Moreover, a front pin 616 and pivot pin 618 may be coupled to the housing 612 and front plate 604. The pivot pin 618 defines a first pivot axis by which the first latch 310 pivots between an unlatched position (FIG. 6) and a latched position 1000 (FIG. 1000).

Figure 6:
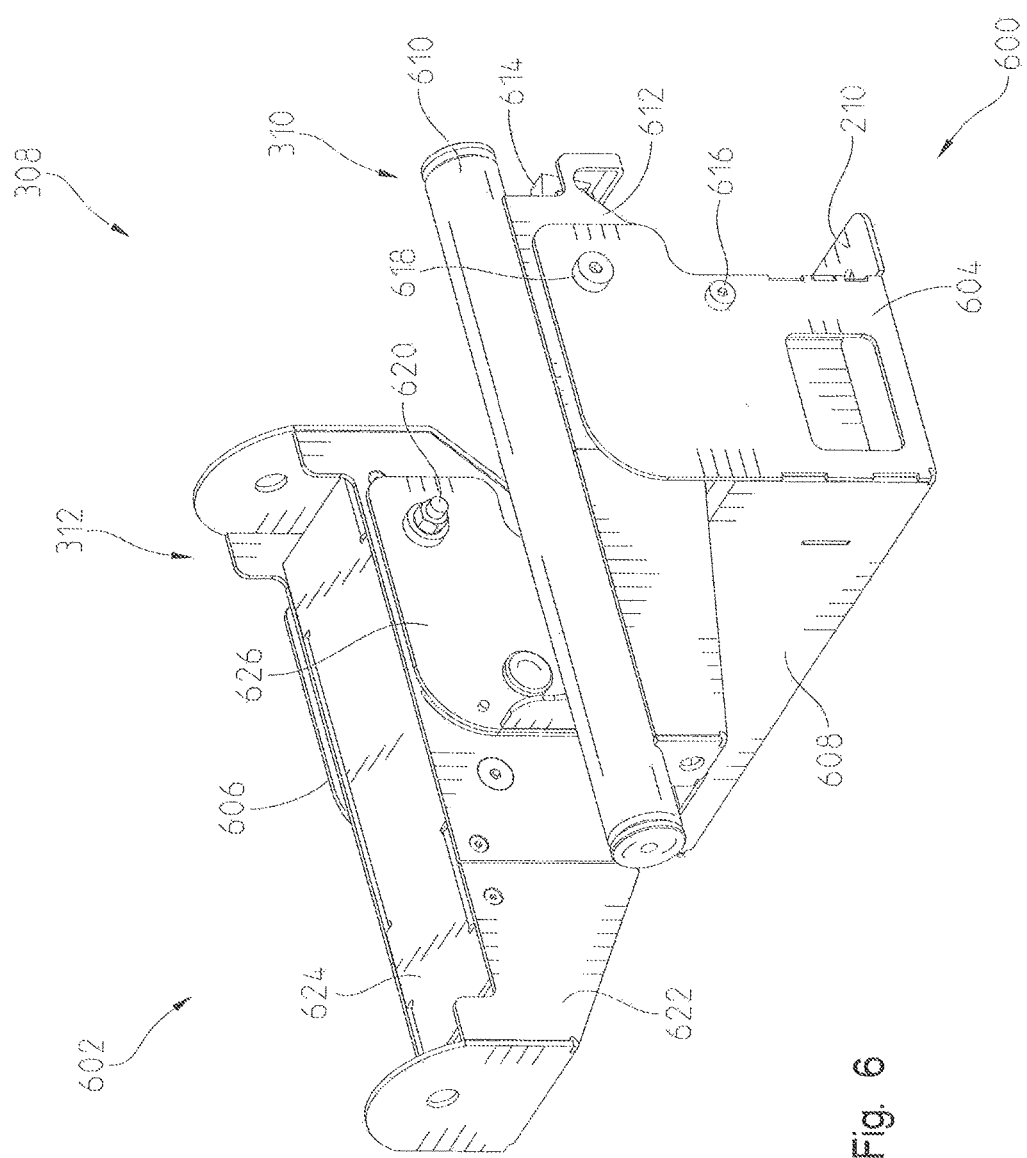
FIG. 6 is a first side perspective view of a latch assembly of the seat assembly.
Figure 7:
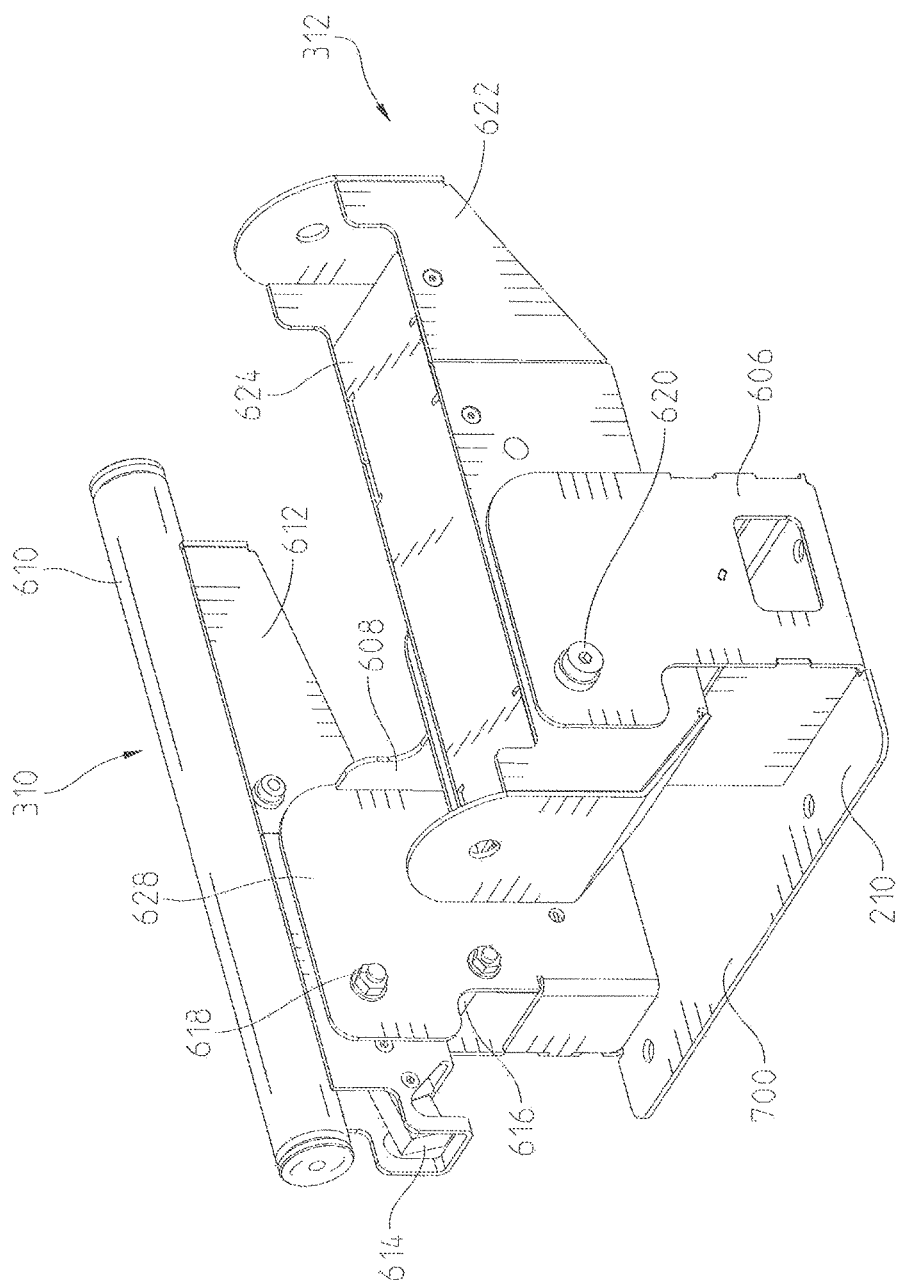
FIG. 7 is a second side perspective view of the latch assembly of FIG. 6.
Figure 10:
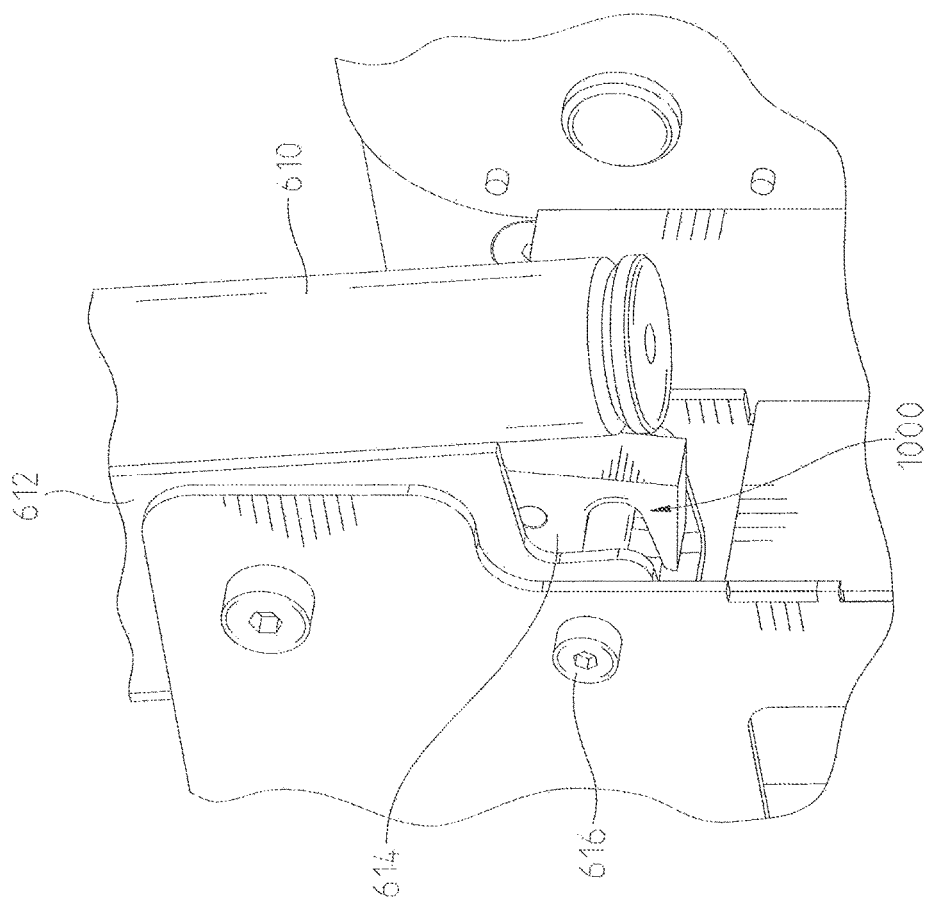
FIG. 10 is a partial perspective view of a first latch of the latch assembly in its latched position.

In the unlatched position of FIG. 6, a front latch 614 of the first latch 310 is disposed offset from the front pin 616. In this position, the seat 200 may be in either its upright, unfolded position of FIG. 2 or its partially folded position of FIG. 3A. When an operator, however, maneuvers the seat 200 to its folded position of FIG. 4, the front latch 614 engages the front pin 616 in the latched position 1000. Moreover, in the latched position, the first latch 310 is pivoted about the pivot pin 618 to a substantially upright, vertical orientation (see FIG. 10). In one non-limiting example, the first latch 310 may pivot approximately 90° between its unlatched position and its latched position. In another non-limiting example, the first latch 310 may pivot less than 90° to its latched position. Other embodiments are possible as known to the skilled artisan whereby the first latch 310 pivots any defined distance to its latched position.

Like the first latch 310, the second latch 312 may also include an outer housing 622. The outer housing 622 may be coupled to the rear plate 606 and side plate 608 according to known means. Moreover, an inner side plate 626 may be provided on a side of the housing 622 opposite the rear plate 606. As such, the housing 622 may be coupled between the rear plate 606 and the inner side plate 626. The second latch 312 may further include a latch housing 624 that at least partially surrounds a latch member 1104 (FIG. 11).

The outer housing 622, latch housing 624, rear plate 606 and inner side plate 626 each include a plurality of openings through which fasteners 900 may couple these components to one another. Moreover, a pivot pin 620 may be coupled thereto so that the second latch 312 may pivot relative thereto. The pivot pin 620 defines a pivot axis by which the second latch 312 pivots. In addition, a pin 1100 (FIG. 11) may be disposed through one of the plurality of openings to which the latch member 1104 engages when the second latch 312 is in its latched position. This will be described in more detail shortly.

Figure 8:
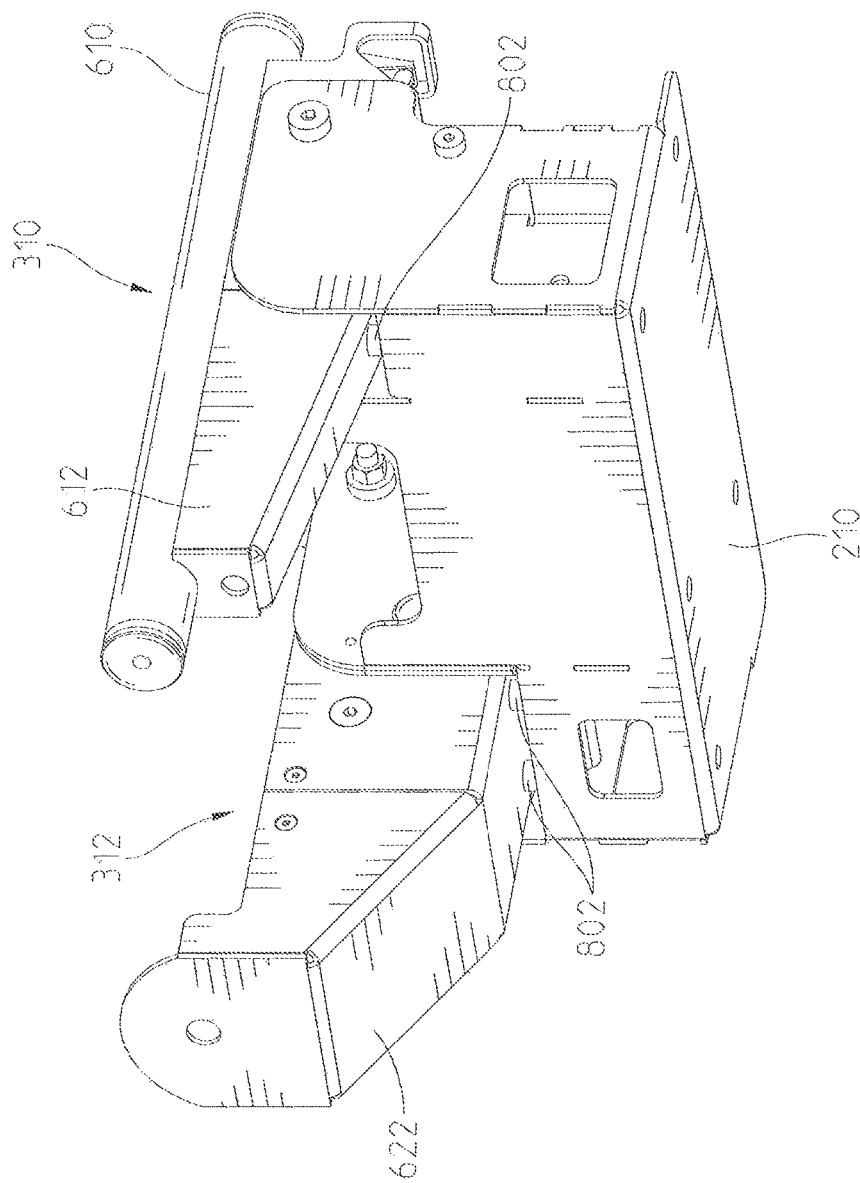
FIG. 8 is another side perspective view of the latch assembly of FIG. 6.

Turning to FIG. 8, the first latch 310 is shown in its unlatched position and the second latch 312 is shown in its latched position. Here, the seat 200 may be in either its upright, unfolded position of FIG. 2 or its partially folded position 300 of FIG. 3A. A plurality of bumpers 802 are also shown coupled to a top surface of the side plate 608. In the position of FIG. 8, the housing 612 of the first latch 310 and the outer housing 622 of the second latch 312 may rest upon these plurality of bumpers 802. The plurality of bumpers 802 can offer advantages with anti-rattling and further protect the surfaces of the respective housings. Other advantages may be associated with these bumpers as known to the skilled artisan.

Figure 11:
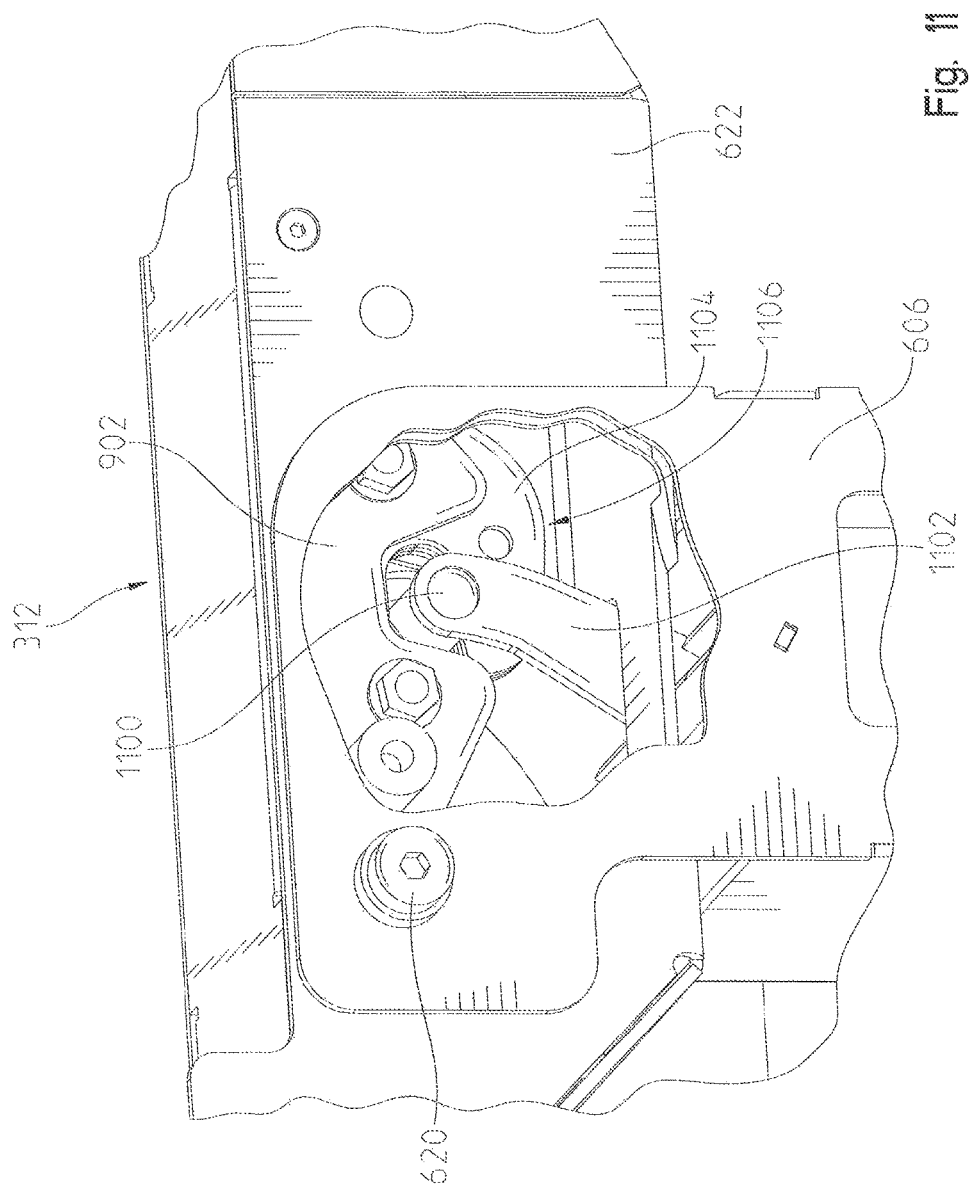
FIG. 11 is a partial perspective view of a second latch of the latch assembly in its latched position.

Referring to FIG. 11, the second latch 312 is shown in its latched position 1106. The second latch 312 includes the latch member 1104 which engages the pin 1100 to securely latch the seat 200 to the base 210. The pin 1100 may be coupled to a pair of arms 1102 as shown in FIG. 11. The pair of arms 1102 each include an opening in which the pin 1100 is disposed.

Figure 9:
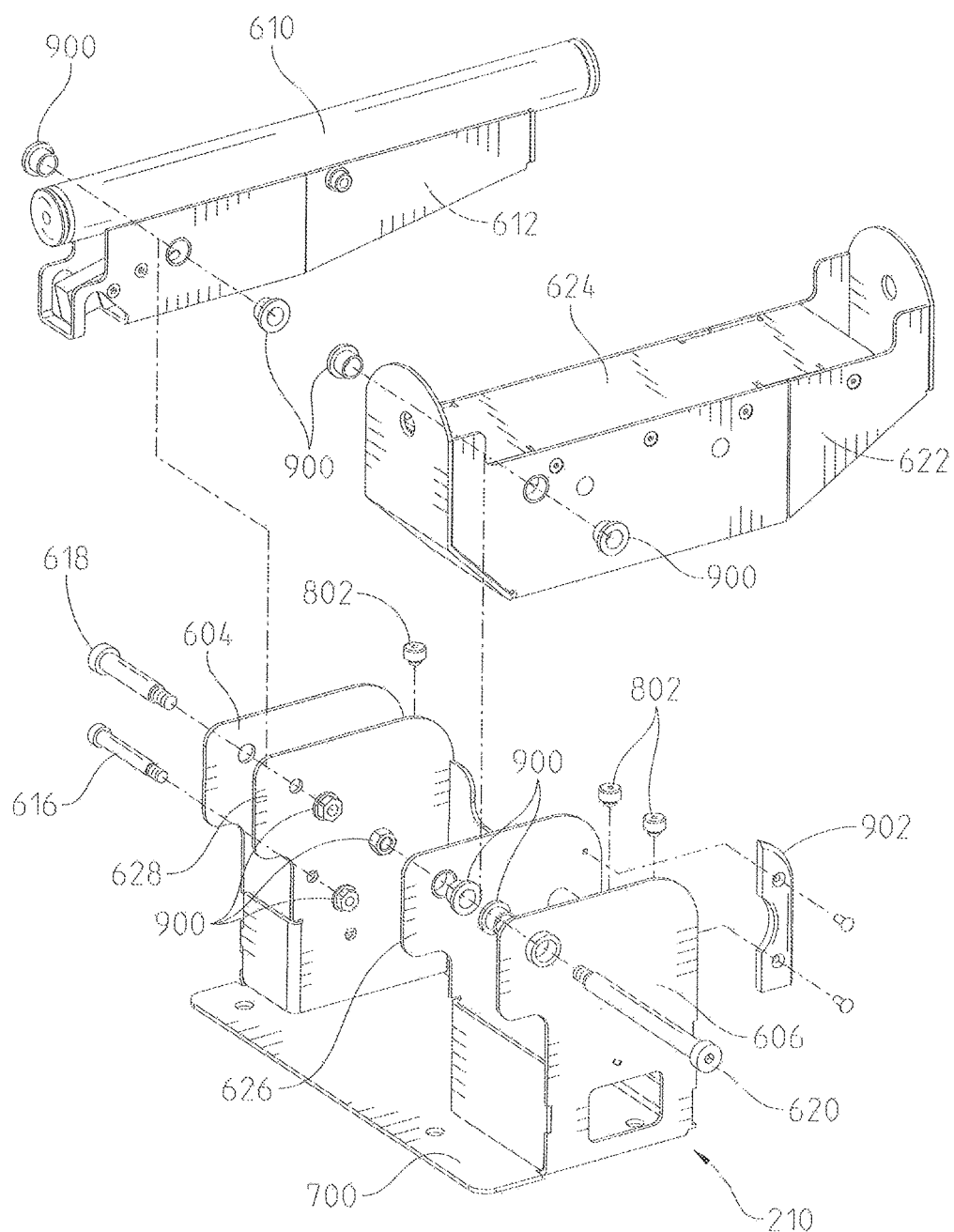
FIG. 9 is an exploded view of the latch assembly.
Figure 12:
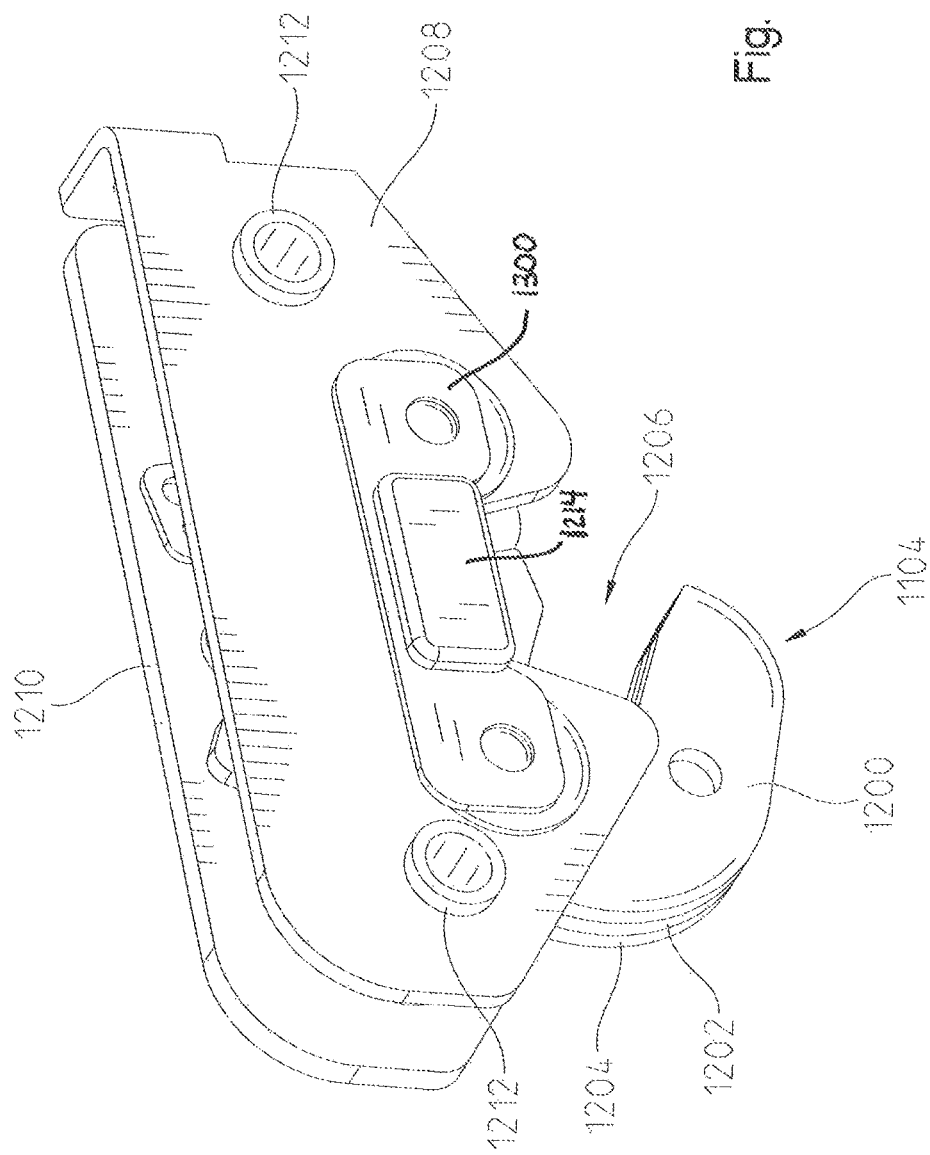
FIG. 12 is a perspective view of the second latch.
Figure 13:
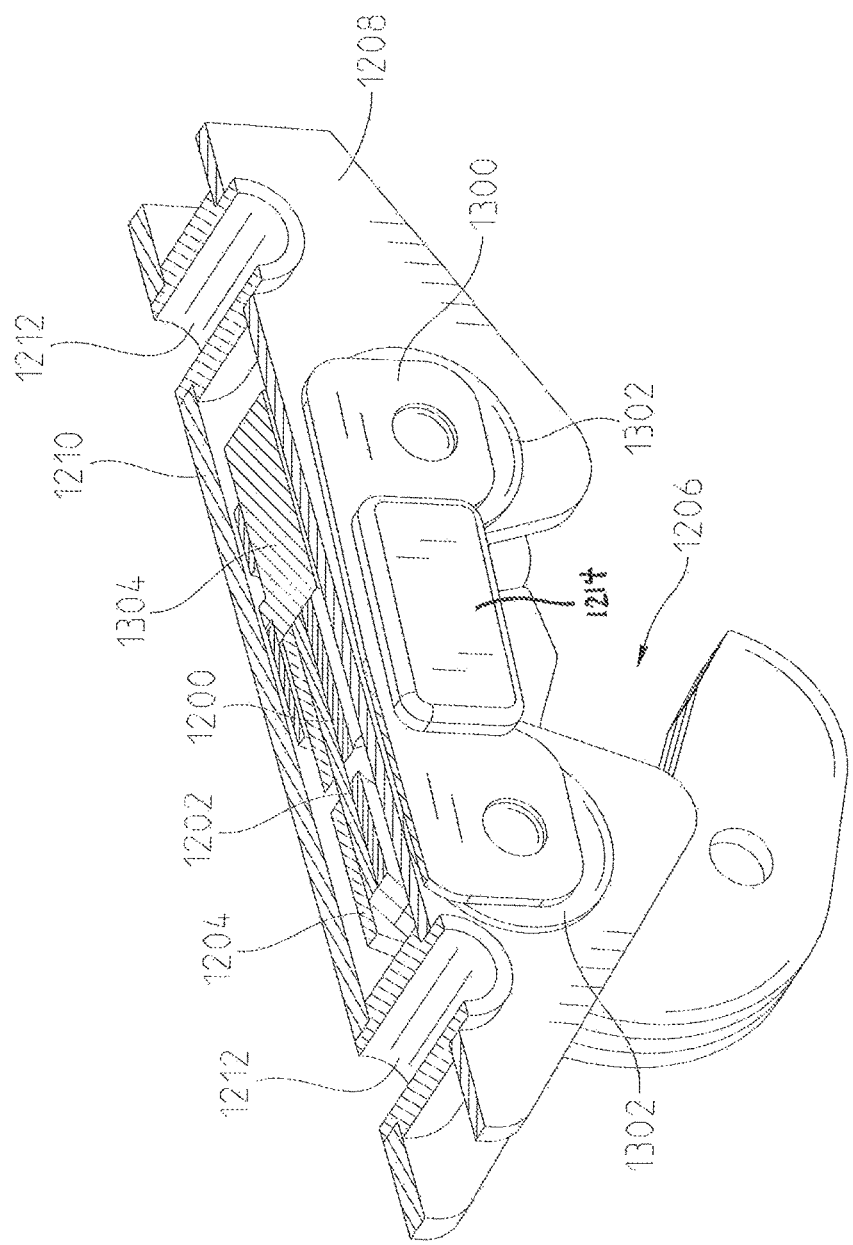
FIG. 13 is a perspective and partial cross-sectional view of the second latch.

As shown in FIGS. 9 and 11, the second latch 312 further includes a plate 902 with openings defined therein. Fasteners 1212 may couple the latch member 1104 to the plate 902 as shown. This is shown in greater detail in FIGS. 12 and 13. In particular, the latch member 1104 may be formed as a C-shaped body with a defined opening 1206 for receiving the pin 1100. The latch member 1104 may be formed by a first plate 1200, a second plate 1202, and a third plate 1204 as shown in FIG. 12. Each of the first plate 1200, second plate 1202, and third plate 1204 may be coupled to a block 1304 as shown in FIG. 13. The block 1304 and each plate may further be coupled between the plate 1210 in FIG. 12, a latch body 1208, and a bumper plate 1300 in FIG. 13. Washers 1302 and other fasteners 1212 may be used as coupling mechanisms. The entire assembly of FIGS. 12 and 13 may be disposed within the outer housing 622 as described above.

As also shown in FIGS. 12 and 13, an anti-rattle bumper 1214 may be provided. This bumper 1214 may be formed of a rubber material that is compressed on the striker pin of the seat base when latched in the down position. The anti-rattle bumper 1214 may be formed of other types of material for reducing rattle, vibration, and other undesirable noise.

Figure 14:
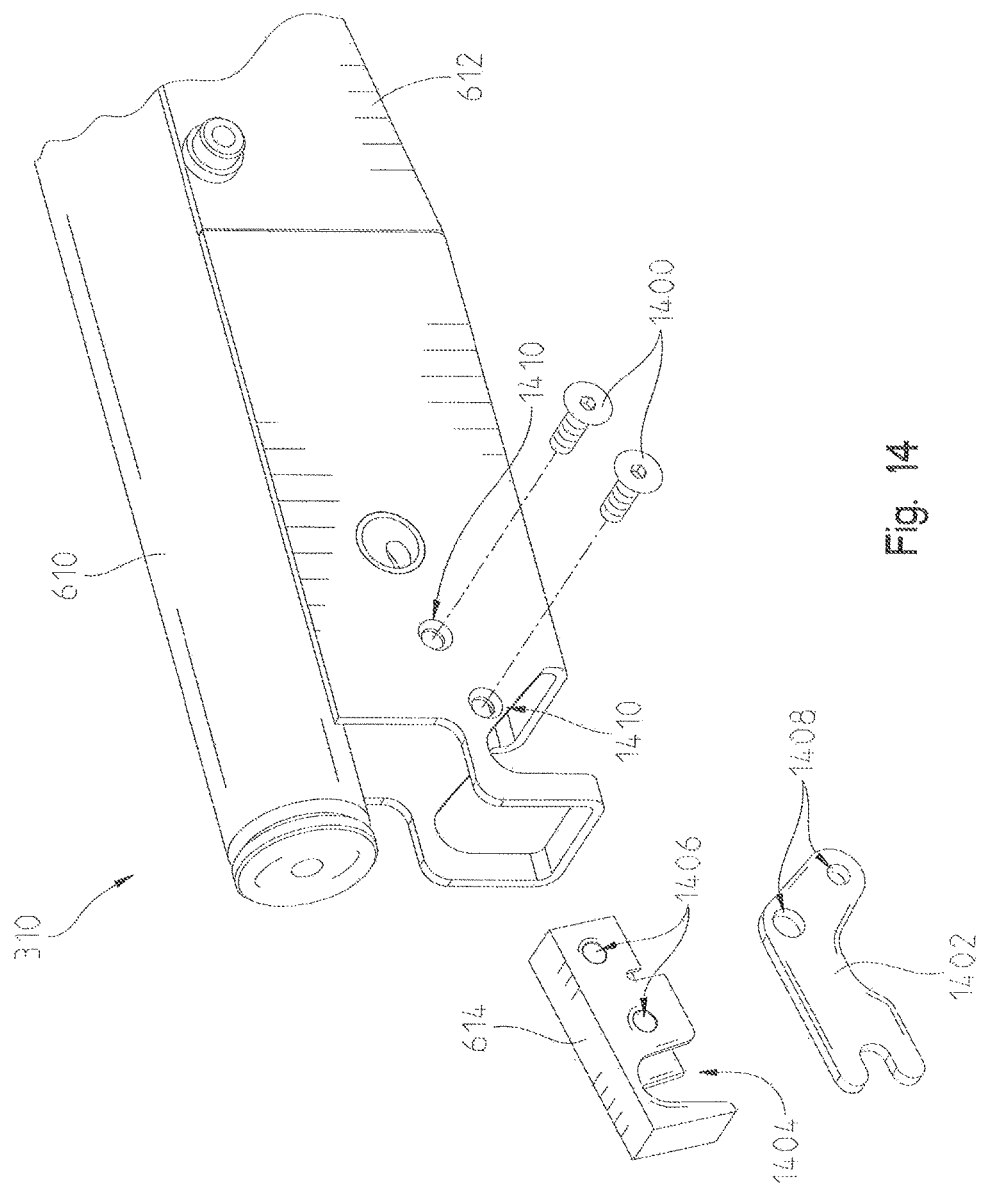
FIG. 14 is a partial exploded view of the first latch.

In FIG. 14, the first latch 310 is shown in more detail. Here, the front latch 614 may include a pair of openings 1406. Likewise, a plate 1402 may also include a pair of openings 1408. Fasteners 1400 may be used to securely couple the front latch 614 and plate 1402 to a pair of openings 1410 defined in the housing 612 of the first latch 310. In the latched position 1000 of FIG. 10, the pin 616 may be disposed within an opening 1404 defined in the front latch 614.

Figure 15:
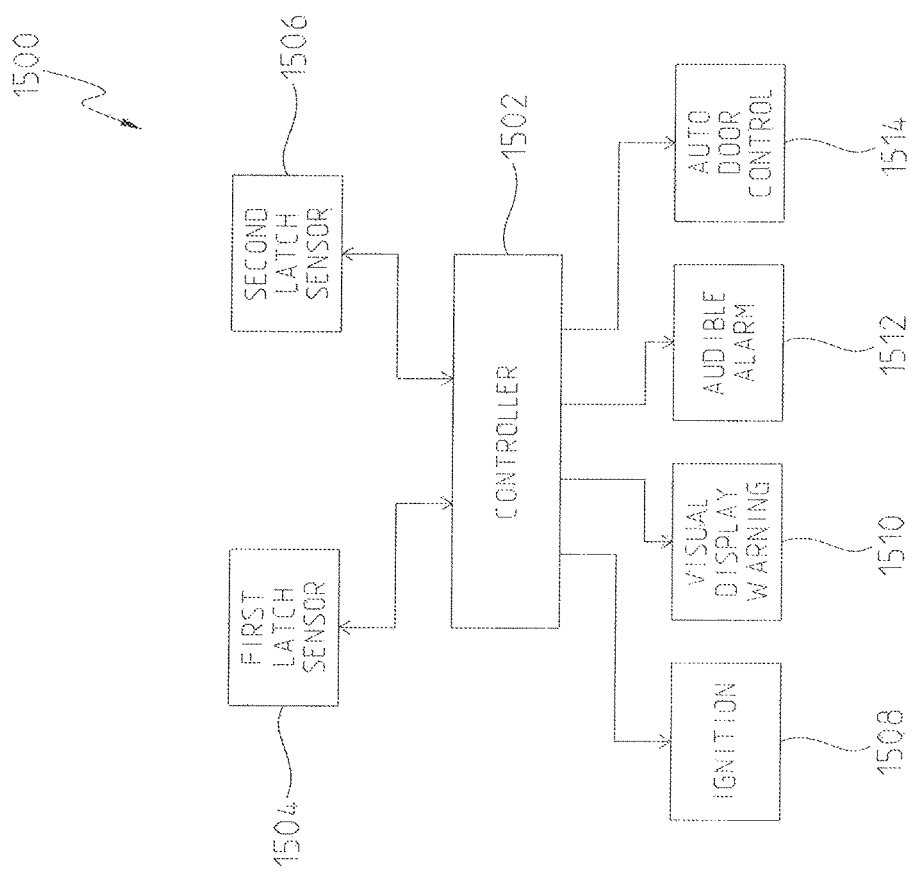
FIG. 15 is a control schematic of a latch assembly.

In one embodiment, a controls schematic and process may be implemented based on the latch assembly 308 and seat 200. In FIG. 15, one such example is provided. In this embodiment, a control system 1500 may include a controller 1502 for controlling one or more functions of the vehicle 100. The controller 1502 may be a vehicle controller, an engine controller, a transmission controller, or any other controller. In one aspect, the controller 1502 may be a control system that includes a plurality of controllers.

The control system 1500 may be designed to detect the position of each seat 200 in the vehicle 100. For safety reasons, it may be desirable to ensure each seat 200 is securely latched in its upright, unfolded position, its partially folded position, or its folded position. In particular, the system 1500 may detect if the latch assembly 308 of each seat 200 is working properly. In this system 1500, a first latch sensor 1502 and a second latch sensor 1504 are shown.

In this embodiment, the control system 1500 is detecting the operability of the latch assembly 308 of one seat 200, but in other embodiments there may be a plurality of sensors for detecting the operability of the latch assembly 308 of multiple seats 200. In FIG. 1A, for example, there may be sensors detecting the operability of the latch system 308 for each of the first rear seat 126 and the second rear seat 128.

In the illustrated embodiment of FIG. 15, the first latch sensor 1504 may detect if the first latch 310 is disposed in its latched or unlatched position. The first latch sensor 1504 may be a proximity sensor, a position sensor, or any known type of sensor or switch. Likewise, the second latch sensor 1506 may detect if the second latch 312 is disposed in its latched or unlatched position. Based on the detected position, the first latch sensor 1504 and second latch sensor 1506 may communicate with the controller 1502 the respective detected position. This communication may be via a wired connection or wireless connection. The communication may be over a Controller Area Network (CAN) or other known type of communication network.

Once the controller 1502 receives the detected position communication from the first and second latch sensors, the controller 1502 can determine if the seat 200 is securely latched in a desired position. For example, if the controller 1502 receives a signal from both sensors indicating that both latches are in their unlatched position, the controller 1502 can be programmed to trigger a response. The response may be to send a signal to an ignition 1508 on the vehicle 100 to prevent the vehicle from starting. Another type of response may be to communicate a visual warning 1510 on a display or dashboard of the vehicle 100. The controller 1502 may also trigger an audible alarm 1512 such as a chime or other audible noise. Moreover, the controller 1502 may disable a power feature to a door or rear hatch. For instance, a button may trigger a sliding door to move from its open position to its closed position. If, however, the seat 200 closest to the sliding door is not securely latched, the controller 1502 may disable the button from controlling movement of the door. Any of the above examples may be used by the controller 1502 to trigger a response when the seat 200 is not properly latched. Other responses are also possible. The vehicle may also include visual indicators such as lights that may be illuminated when at least one of the latches is in its latched position.

The controller 1502 may also trigger a communication to the display or dashboard in the vehicle when all seats are securely latched. Thus, the controller 1502 may be programmed to communicate with a vehicle operator based on any position in which the seat and latch assembly is disposed.

In another embodiment, an integration of a main latch with an OEM pull cord may be incorporated. The main latch, for example, may include either or both the first latch 310 and second latch 312. In any event, the use of the OEM pull cord allows for folding the seat 200 more easily. In use, when the OEM pull cord is pulled by a user, a latch within the OEM seat (e.g., seat 200) and a latch within the back portion 204 are released, thereby allowing the seat 200 to fold down on itself (see FIG. 3A) via the use of an internal spring mechanism (not shown). By pulling on the OEM cord, the latch assembly 308 is also released at the same time.

In this embodiment, a gas spring may be disposed on the base 210 which will assist the user with folding the base but also to prevent the main latch from immediately re-engaging when the OEM cord is released.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A latch assembly of a seat in a vehicle, comprising:
a base including a first pin and a second pin;
a first latch movable between a latched position and an unlatched position and including a first housing and a first latch mechanism at least partially enclosed within the first housing, the first latch being pivotally coupled to the base; and
a second latch movable between a latched position and an unlatched position and including a second housing and a second latch mechanism at least partially enclosed within the second housing, the second latch being pivotally coupled to the base;
wherein, the first latch is disposed in its latched position when the first latch mechanism engages the first pin with the first housing substantially vertical, and the second latch is disposed in its latched position when the second latch mechanism engages the second pin with the second housing substantially horizontal;
wherein, the first latch and the second latch cannot be disposed in their respective latched positions at the same time,
wherein the first latch mechanism is offset from the first pin when the first latch is in the unlatched position.

2. The latch assembly of claim 1, further comprising:
a front plate disposed at a front end;
a rear plate disposed at a rear end;
a first side plate and a second side plate, the first side plate being spaced from the second side plate, and both the first and second inner side plates being disposed substantially parallel to and between the front plate and the rear plate;
wherein, the first latch is pivotally coupled to the front plate and first side plate, and the second latch is pivotally coupled to the rear plate and the second side plate.

3. The latch assembly of claim 1, further comprising anti-rattle bumpers disposed in contact with the first and second latches in one of their latched or unlatched positions.

4. The latch assembly of claim 1, wherein the first latch is movable about a pivot pin between its latched position and its unlatched position.

5. The latch assembly of claim 4, wherein the first latch is movable approximately 90° between its latched and unlatched positions.

6. The latch assembly of claim 1, wherein the first latch comprises:
a cylindrically-shaped front bar configured to couple to the seat; and
a plate coupled to the first housing.

7. The latch assembly of claim 1, wherein the second latch mechanism comprises a first plate, a second plate, and a third plate.

8. The latch assembly of claim 7, wherein the first plate, the second plate, and the third plate comprise substantially C-shaped bodies with a defined opening for receiving the second pin.

9. The latch assembly of claim 1, wherein the second latch comprises a latch body and an anti-rattle bumper, the anti-rattle bumper formed of a compressive material configured to compress against the seat in the latched position of the second latch.

10. A seat assembly of a vehicle, comprising:
a seat portion;
a back portion pivotally coupled to the seat portion;
a rail system comprising a first arm and a second arm, the first arm being spaced from the second arm;
a latch assembly comprising a base, a first latch, and a second latch, wherein:
the base including a first pin and a second pin;
the first latch includes a first housing and a first latch mechanism at least partially enclosed within the first housing, the first latch being pivotally coupled to the base; and
the second latch includes a second housing and a second latch mechanism at least partially enclosed within the second housing, the second latch being pivotally coupled to the base;
wherein, the seat assembly is configurable in at least a first position and a second position;
wherein, in the second position of the seat assembly the first latch is disposed in its latched position with the first latch mechanism engaging the first pin, and in the first position of the seat assembly the second latch is disposed in its latched position with the second latch mechanism engaging the second pin, and
wherein in the first position of the seat assembly the first latch mechanism is offset from the first pin.

11. The seat assembly of claim 10, wherein the first latch and the second latch are not disposed in their respective latched positions at the same time.

12. The seat assembly of claim 10, wherein the first latch is coupled to the first arm and the second arm in the first and second positions of the seat assembly.

13. The seat assembly of claim 10, wherein:
in the first position of the seat assembly the first latch is disposed in an unlatched position,
in the second position of the seat assembly the second latch is disposed in an unlatched position, and
the latch assembly of claim 11 further comprises anti-rattle bumpers disposed in contact with the first and second latches in one of their latched or unlatched positions.

14. The seat assembly of claim 10, wherein the first latch is movable about a pivot pin between its latched position and an unlatched position.

15. The seat assembly of claim 10, wherein the second latch mechanism comprises a first plate, a second plate, and a third plate.

16. The seat assembly of claim 10, wherein the second latch comprises a latch body and an anti-rattle bumper, the anti-rattle bumper formed of a compressive material configured to compress against the seat in the latched position.

17. A vehicle for accommodating a wheel-chaired passenger, comprising:
a body;
a controller for controlling the vehicle;
a plurality of seats coupled to the body, where each of the plurality of seats includes a latch assembly;
the latch assembly including a base having a first pin and a second pin, a first latch pivotally coupled to the base and including a first housing and a first latch mechanism at least partially enclosed within the first housing, and a second latch pivotally coupled to the base and including a second housing and a second latch mechanism at least partially enclosed within the second housing;

a first latch sensor for detecting a position of the first latch, the first latch being in communication with the controller; and a second latch sensor for detecting a position of the second latch, the second latch being in communication with the controller;

wherein, at least one of the plurality of seats is configurable in at least one of an unfolded position and a folded position;

wherein, in the folded position the first latch is disposed in a latched position with the first latch mechanism engaging the first pin, and in the unfolded position the second latch is disposed in a latched position with the second latch mechanism engaging the second pin;

wherein:

the first latch is movable to an unlatched position, and the first latch mechanism is offset from the first pin when the first latch is in the unlatched position; and further wherein, the controller is configured to receive a signal from the first latch sensor and second latch sensor indicative of the detected position of the first latch and second latch, respectively.

18. The vehicle of claim 17, wherein the controller outputs a response based on the detected positions of the first latch and the second latch.

19. The vehicle of claim 18, wherein the response comprises at least one of disabling an ignition, displaying a visual warning on a display, triggering an audible alarm, or disabling an auto door control feature on the vehicle.

20. The seat assembly of claim 10, wherein:

in the first position of the seat assembly the back portion is disposed upright relative to the seat portion, and in the second position of the seat assembly the seat portion is disposed in a folded position.

* * * * *